(12) United States Patent
Li (10) Patent No.: US 11,581,021 B2
(45) Date of Patent: Feb. 14, 2023

(54) METHOD AND APPARATUS FOR LOCATING VIDEO PLAYING NODE, DEVICE AND STORAGE MEDIUM

(71) Applicant: Beijing Baidu Netcom Science Technology Co., Ltd., Beijing (CN)

(72) Inventor: Weiguo Li, Beijing (CN)

(73) Assignee: Beijing Baidu Netcom Science Technology Co., Ltd., Beijing (CN)

(*) Notice: Subject to any disclaimer, the term of this patent is extended or adjusted under 35 U.S.C. 154(b) by 0 days.

(21) Appl. No.: 17/207,132

(22) Filed: Mar. 19, 2021

(65) Prior Publication Data
US 2021/0233571 A1    Jul. 29, 2021

(30) Foreign Application Priority Data
Aug. 28, 2020  (CN) .......................... 202010891723.0

(51) Int. Cl.
*G11B 27/10*     (2006.01)
*G06V 20/40*    (2022.01)
(Continued)

(52) U.S. Cl.
CPC ............ *G11B 27/102* (2013.01); *G06V 20/41* (2022.01); *G10L 15/1815* (2013.01); *G10L 15/22* (2013.01); *G10L 25/57* (2013.01)

(58) Field of Classification Search
USPC ............................................... 386/239–248
See application file for complete search history.

(56) References Cited

U.S. PATENT DOCUMENTS 7,167,866 B2   1/2007   Farnham et al.
9,940,693 B2   4/2018   Ohki et al.
(Continued)

FOREIGN PATENT DOCUMENTS

CN   102668550   9/2012
CN   102833638   12/2012
(Continued)

OTHER PUBLICATIONS

European Extended Search Report, issued in the corresponding European patent application No. 21164069.3, dated Jul. 12, 2021, 9 pages.
(Continued)

*Primary Examiner* — Hung Q Dang
(74) *Attorney, Agent, or Firm* — Hamre, Schumann, Mueller & Larson, P.C.

(57) ABSTRACT

The disclosure provides a method for locating a video playing node, and relates to fields of big data and video processing. The method includes: selecting a target video out from a plurality of videos; and sending the target video, a plurality of subtitle text segments of the target video and start time information of each of the plurality of subtitle text segments to a client, to cause the client to display the plurality of subtitle text segments, and determine, in response to a trigger operation on an any subtitle text segment of the plurality of subtitle text segments, a start playing node of the target video based on the start time information of the any subtitle text segment. The disclosure further provides an apparatus for locating a video playing node, an electronic device and a storage medium.

20 Claims, 7 Drawing Sheets

For each of the first group of videos, the video is classified by using a pre-trained classifier to determine a category of the video — S413

Videos belonging to a predetermined category are selected out from the first group of videos, as a second group of videos — S414

(51) Int. Cl.
*G10L 15/18* (2013.01)
*G10L 15/22* (2006.01)
*G10L 25/57* (2013.01)
*H04N 21/472* (2011.01)
*H04N 21/488* (2011.01)
*H04N 21/44* (2011.01)
*H04N 21/845* (2011.01)
*H04N 21/439* (2011.01)

(56) References Cited

U.S. PATENT DOCUMENTS

| | | | |
|---|---|---|---|
| 11,204,959 B1* | 12/2021 | Boyd | G06V 20/41 |
| 2005/0152680 A1 | 7/2005 | Chen et al. | |
| 2005/0165824 A1 | 7/2005 | Farnham et al. | |
| 2008/0124055 A1* | 5/2008 | Shahraray | H04N 21/4332 |
| | | | 348/E5.007 |
| 2011/0286715 A1 | 11/2011 | Zhang et al. | |
| 2013/0177891 A1* | 7/2013 | Hammerschmidt | G09B 5/06 |
| | | | 434/309 |
| 2015/0109342 A1 | 4/2015 | Ohki et al. | |
| 2016/0034786 A1 | 2/2016 | Suri et al. | |
| 2016/0295294 A1* | 10/2016 | Lan | H04N 21/845 |
| 2017/0187772 A1 | 6/2017 | Paul | |
| 2021/0073551 A1* | 3/2021 | Li | G06V 10/454 |
| 2021/0192220 A1* | 6/2021 | Qu | G06V 10/82 |
| 2021/0406601 A1* | 12/2021 | Narlikar | G06K 9/6268 |

FOREIGN PATENT DOCUMENTS

| | | |
|---|---|---|
| CN | 103838751 | 6/2014 |
| CN | 103997663 | 8/2014 |
| CN | 105163178 | 12/2015 |
| CN | 105338419 | 2/2016 |
| CN | 108337533 | 7/2018 |
| CN | 108401189 | 8/2018 |
| CN | 109246472 | 1/2019 |
| CN | 109743617 | 5/2019 |
| JP | 2003-199028 | 7/2003 |
| JP | 2005-242998 | 9/2005 |
| JP | 2006-245907 | 9/2006 |
| JP | 2009-055459 | 3/2009 |
| JP | 2010-124155 | 6/2010 |
| JP | 2014-044268 | 3/2014 |
| JP | 2017-054257 | 3/2017 |
| WO | 2020/024353 | 2/2020 |

OTHER PUBLICATIONS

Chinese Office Action, issued in the corresponding Chinese patent application No. 202010891723.0, dated Dec. 23, 2021, 20 pages.
European Office Action, issued in the corresponding European Application No. 21164069.3, dated Apr. 5, 2022, 8 pages.
Japanese Office Action, issued in the corresponding Japanese Application No. 2021-055712, dated Apr. 26, 2022, 10 pages (including machine translation).

* cited by examiner

METHOD AND APPARATUS FOR LOCATING VIDEO PLAYING NODE, DEVICE AND STORAGE MEDIUM

CROSS-REFERENCE TO RELATED APPLICATION(S)

This application claims priority to the Chinese Patent Application No. 202010891723.0, filed on Aug. 28, 2020, which is incorporated herein by reference in its entirety.

TECHNICAL FIELD

The present disclosure relates to the field of computer technology, in particular to big data and video processing technology, and more specifically, the present disclosure provides a method and an apparatus for locating a video playing node, a device and a storage medium.

BACKGROUND

With continuous development of Internet technology, various video playing platforms have been widely developed. As a carrier of information dissemination, video is widely spread and applied due to a feature of expressing information more intuitively, richly and clearly. When a user watches a video, for example, when watching a video having rich contents and needing to be watched repeatedly, the user usually wishes to jump to a playing node of a specific content to start playing the video.

SUMMARY

The present disclosure provides a method and an apparatus for locating a video playing node, a device and a storage medium.

According to a first aspect, the present disclosure provides a method for locating a video playing node, including: selecting a target video out from a plurality of videos; and sending the target video, a plurality of subtitle text segments of the target video and start time information of each of the plurality of subtitle text segments to a client, to cause the client to display the plurality of subtitle text segments, and determine, in response to a trigger operation on an any subtitle text segment of the plurality of subtitle text segments, a start playing node of the target video based on the start time information of the any subtitle text segment.

According to a second aspect, the present disclosure provides a method for locating a video playing node, including: acquiring a target video, a plurality of subtitle text segments of the target video, and start time information of each of the plurality of subtitle text segments, wherein the target video is obtained by selecting out from a plurality of videos; displaying the plurality of subtitle text segments; determining, in response to a trigger operation on an any of the plurality of subtitle text segments, a start playing node of the target video based on the start time information of the any subtitle text segment.

According to a third aspect, the present disclosure provides an apparatus for locating a video playing node, including: a selection module configured to select a target video out from a plurality of videos; and a playing node management module configured to send the target video, a plurality of subtitle text segments of the target video and start time information of each of the plurality of subtitle text segments to a client, to cause the client to display the plurality of subtitle text segments, and determine, in response to a trigger operation on an any subtitle text segment of the plurality of subtitle text segments, a start playing node of the target video based on the start time information of the any subtitle text segment.

According to a fourth aspect, the present disclosure provides an apparatus for locating a video playing node, including: an acquisition module, a display module and a playing node locating module. The acquisition module is configured to acquire a target video, a plurality of subtitle text segments of the target video, and start time information of each of the plurality of subtitle text segments, wherein the target video is obtained by selecting out from a plurality of videos. The display module is configured to display the plurality of subtitle text segments. The playing node locating module is configured to determine, in response to a trigger operation on an any of the plurality of subtitle text segments, a start playing node of the target video based on the start time information of the any subtitle text segment.

According to a fifth aspect, the present disclosure provides an electronic device, including: at least one processor; and a memory coupled in communication with the at least one processor; wherein, the memory stores instructions executable by the at least one processor, and the instructions, when executed by the at least one processor, cause the at least one processor to perform the method provided by the present disclosure.

According to a sixth aspect, the present disclosure provides a non-transitory computer-readable storage medium having computer instructions stored thereon that, when executed by a computer, cause the computer to perform the method provided by the present disclosure.

It should be understood that the content described in this section is not intended to identify the key or important features of the embodiments of the present disclosure, and is not intended to limit the scope of the present disclosure. Other features of the present disclosure may be easily understood through the following specification.

BRIEF DESCRIPTION OF THE ACCOMPANYING DRAWINGS

The accompanying drawings are used to better understand the present disclosure, and do not constitute a limitation to the present disclosure, in which.

DETAILED DESCRIPTION

Hereinafter, exemplary embodiments of the present disclosure are described with reference to the accompanying drawings, in which various details of the embodiments of the present disclosure are included to help understand the present disclosure and should be regarded as merely exemplary. Therefore, those of ordinary skill in the art should recognize that various changes and modifications may be made to the embodiments described herein without departing from the scope and spirit of the present disclosure. Similarly, for clarity and conciseness, descriptions of well-known functions and structures are omitted in the following description.

With continuous development of Internet technology, various video playing platforms have been widely developed. As a carrier of information dissemination, video is widely spread and applied due to a feature of expressing information more intuitively, richly and clearly. When a user watches a video, for example, when watching a video having rich contents (such as a knowledge video, and a popular science video) and needing to be watched repeatedly, the user usually wishes to jump to a playing node of a specific content to start playing the video.

In such a scene, the user may find the playing node meeting a watching demand by playing the video quickly such as at double speed or fast forward, or by supporting a video preview of a current frame when dragging a progress bar. Above manners require users to spend a relatively long time to find an expected content, and locating of the playing node is not accurate enough.

Figure 1:
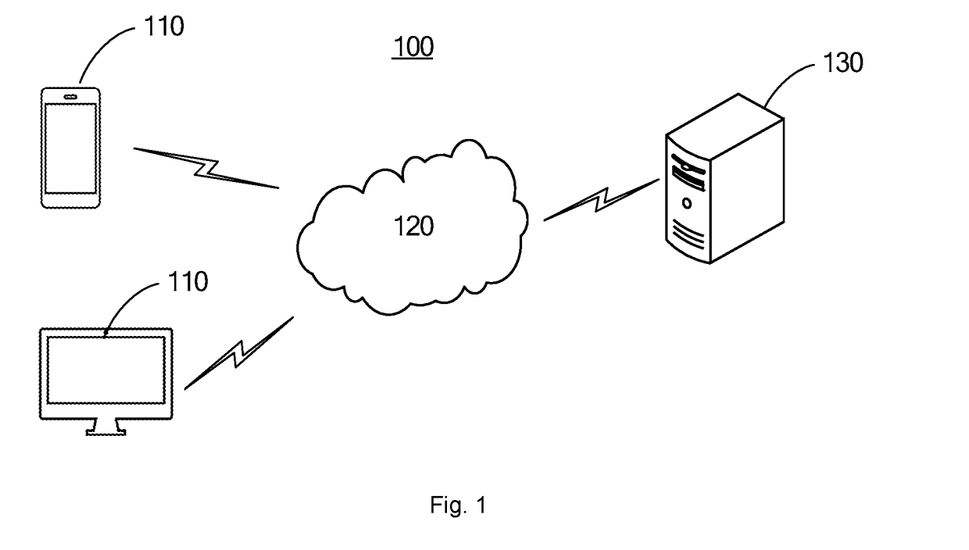
FIG. 1 is an exemplary system architecture to which a method and an apparatus for locating a video playing node may be applied according to an embodiment of the present disclosure.

FIG. 1 is an exemplary system architecture 100 to which a method and an apparatus for locating a video playing node may be applied according to an embodiment of the present disclosure. It should be noted that FIG. 1 is only an example of a system architecture to which the embodiments of the present disclosure may be applied, so as to help those skilled in the art to understand the technical content of the present disclosure. It does not mean that the embodiments of the present disclosure cannot be used in other devices, systems, environments or scenes.

As shown in FIG. 1, the system architecture 100 of this embodiment may include a plurality of terminal equipment 110, a network 120, and a server 130. Among which, the terminal equipment 110 may be various electronic devices supporting video playing, such as a smart phone, a tablet computer, a laptop computer, and a desktop computer, which is not limited herein. The server 130 may be various electronic devices having certain computing ability, and is not limited herein. An interaction process between the terminal equipment 110 and the server 130 via the network 120 is described exemplarily below. As an example, the terminal equipment 110 may be installed with a video playing application client. The terminal equipment 110 requests video data from the server 130 through the client, and decodes and plays a video based on the video data.

According to the embodiment of the present disclosure, a method for locating a video playing node is provided. The method is described exemplarily with reference to the accompanying drawings. It should be noted that the sequence number of each operation in the following method is only used as a representation of the operation for description, and should not be regarded as representing a performing order of each operation. Unless explicitly indicated, the method does not need to be performed exactly in the shown order.

Figure 2A:
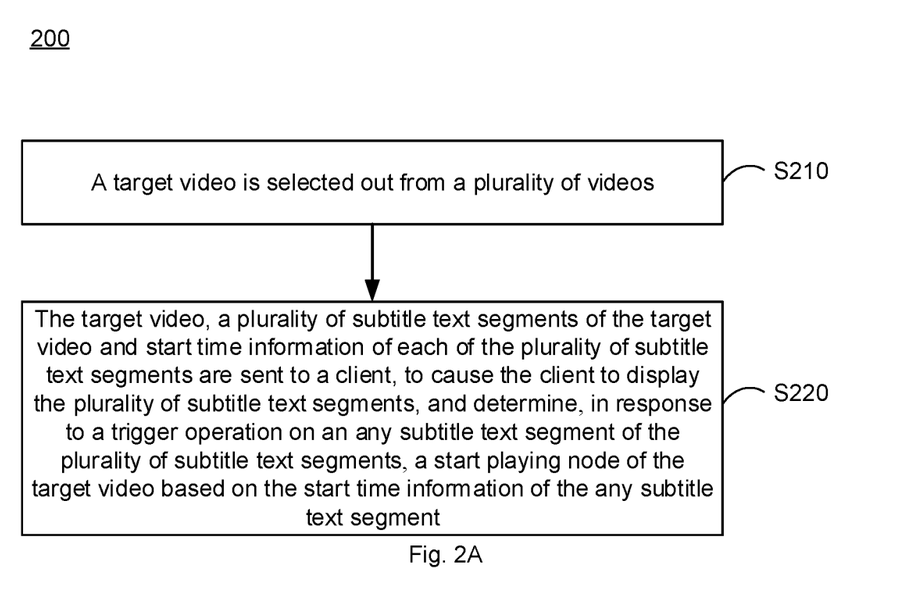
FIG. 2A is a flowchart of a method for locating a video playing node according to an embodiment of the present disclosure.

FIG. 2A is a flowchart of a method for locating a video playing node according to an embodiment of the present disclosure. As an example, the method for locating a video playing node shown in FIG. 2A may be performed by a server.

As shown in FIG. 2A, the method 200 for locating a video playing node may include operations S210 to S220.

In operation S210, a target video is selected out from a plurality of videos.

As an example, the target video may be a video having contents of high value and containing rich information, such as xx knowledge point explanation video, xx popular science video. When watching such videos, the user usually needs to watch a specific content repeatedly, and has a demand for locating a video playing node for such videos. According to the embodiment of the present disclosure, a value of a video may be measured based on information of one or more dimensions of the video, so as to select the video according to a measurement result. A server side of a video playing platform usually has a large number of video resources. The operation S210 may select a target video having a value for locating the playing node out from the large number of videos, saving computing resources for a subsequent video processing.

In operation S220, the target video, a plurality of subtitle text segments of the target video and start time information of each of the plurality of subtitle text segments are sent to a client, to cause the client to display the plurality of subtitle text segments, and determine, in response to a trigger operation on an any subtitle text segment of the plurality of subtitle text segments, a start playing node of the target video based on the start time information of the any subtitle text segment.

As an example, for an any target video A, m subtitle text segments and m pieces of start time information respectively corresponding to the m subtitle text segments are included. Herein, m is an integer greater than 1. Start time information of each subtitle text segment may indicate a start time of the subtitle text segment in a corresponding video. According to the embodiment of the present disclosure, for example, the m subtitle text segments described above may be obtained by recognizing speech contained in the target video A.

As an example, the server may encode video data, m subtitle text segments and m pieces of start time information of the target video A in a predetermined format, in response to a request message for the target video A from a client, and then sends an encoded data packet to the client according to a predetermined communication rule. After decoding the data packet, the client may obtain video data, m subtitle text segments and corresponding m pieces of start time information of the target video A. For a non-target video, the server may only send the video data to the client in response to the request message from the client, so as to save bandwidth.

The embodiment described above illustrates a method for locating a video playing node according to an embodiment of the present disclosure from a server perspective, and in the following, the method for locating a video playing node according to an embodiment of the present disclosure will be illustrated exemplarily from a client perspective.

Figure 2B:
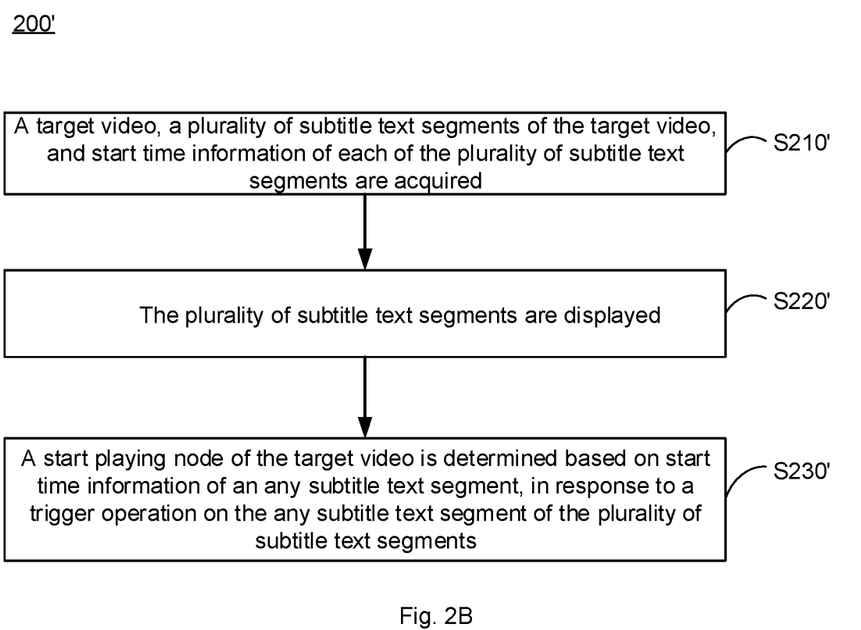
FIG. 2B is a flowchart of a method for locating a video playing node according to another embodiment of the present disclosure.

FIG. 2B is a flowchart of a method for locating a video playing node according to another embodiment of the present disclosure. As an example, the method for locating a video playing node shown in FIG. 2B may be performed by a terminal equipment on which the client is installed.

As shown in FIG. 2B, the method 200' for locating a video playing node may include operations S210' to S230'.

In operation S210', a target video, a plurality of subtitle text segments of the target video, and start time information of each of the plurality of subtitle text segments are acquired.

As an example, the target video is obtained by the server by selecting out from a plurality of videos. A selection process has been illustrated above, and repeated parts of which will not be repeated.

In operation S220', the plurality of subtitle text segments are displayed.

As an example, after receiving video data, m subtitle text segments and m pieces of start time information of the target video A, the client may display the m subtitle text segments to a user. Generally, since different subtitle text segments may correspond to contents of different time points in the target video, the m subtitle text segments displayed by the client provide in effect the user with a summary of contents about the target video A, so that the user may quickly find or recall a content distribution of the target video A. When the user wishes to watch a video content corresponding to some subtitle text segment of the subtitle text segments, a trigger operation may be performed for this subtitle text segment.

In operation S230', a start playing node of the target video is determined based on start time information of an any subtitle text segment, in response to a trigger operation on the any subtitle text segment of the plurality of subtitle text segments.

As an example, in response to a trigger operation on some subtitle text segment, the client may determine a current start playing node of preferential target video A based on the start time information of the subtitle text segment, to jump to the start playing node to play the target video A.

Those skilled in the art may understand that, according to the method for locating a video playing node according to the embodiment of the present disclosure, a target video having a value for locating a playing node may be selected out from a large number of videos, and in a case where the target video is required to be played, a plurality of subtitle text segments of the target video are displayed to a user, and a start playing node of the target video may be determined based on start time information of a subtitle text segment specified by the user. In above process, only the playing node of the target video is processed for locating, so that a large number of computing resources may be saved and interaction efficiency between a server and a client is improved. A plurality of subtitle text segments are displayed jointly, so that the user can determine an expected content node in a short time, and the start playing node of a current video may be accurately determined based on the start time information of the subtitle text segment specified by the user.

Figure 3:
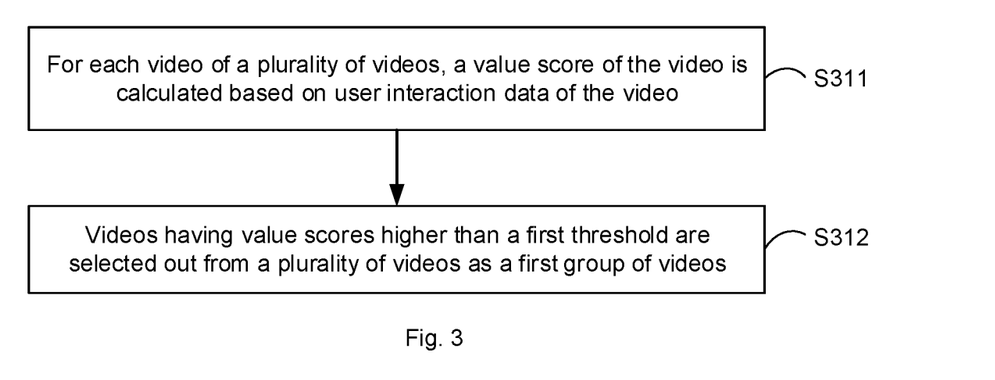
FIG. 3 is a flowchart of a video selection process according to an embodiment of the present disclosure.

FIG. 3 is a flowchart of a video selection process according to an embodiment of the present disclosure, and is used to exemplarily illustrate above implementation of a target video selection out from a plurality of videos.

As shown in FIG. 3, the video selection process may include operations S311 to S312.

In operation S311, for each video of a plurality of videos, a value score of the video is calculated based on user interaction data of the video.

According to the embodiment of the present disclosure, the value score of the video is calculated by using big data analysis. As an example, user interaction data of any video B may include, for example, at least one of a proportion $x_1$ of the quantity of users whose number of times watching the video B is more than a threshold to a total quantity of users who watch the video B, the quantity $x_2$ of comments for the video B, the quantity $x_3$ of collections for the video B and the quantity $x_4$ of praises for the video B. Among which, for example, a predetermined threshold is 1, and the proportion $x_1$ indicates a proportion of the quantity of users repeatedly watching the video B among all users watching the video B. The larger the proportion $x_1$ is, the higher a demand degree of the user for repeatedly watching the video B is. Each of the quantity $x_2$ of comments, the quantity $x_3$ of collections and the quantity $x_4$ of praises may indicate a liking degree and an attention degree of the user for video B. In other embodiments, other user interaction data capable of indicating a user's demand degree for repeatedly watching, a liking degree, an attention degree and other features to the video may also be selected by using big data analysis, and is not limited here.

For example, when the proportion $x_1$, the quantity $x_2$ of comments, the quantity $x_3$ of collections and the quantity $x_4$ of praises are selected as the user interaction data, the value score S of video B may be calculated according to formula (1).

$$S=\alpha \times x_1 + \beta \times x_2 + \gamma \times x_3 + \delta \times x_4 \qquad \text{Formula (1)}$$

In which, $\alpha$, $\beta$, $\gamma$ and $\delta$ are preset first weight, second weight, third weight and fourth weight. In the above process, a weighted sum of the proportion $x_1$, the quantity $x_2$ of comments, the quantity $x_3$ of collections and the quantity $x_4$ of praises is obtained by using the preset first weight, second weight, third weight and fourth weight, to calculate the value score of the video B. Similarly, a value score for each video on the server side may be obtained by calculating. Since the value score is obtained based on a user's real interaction data to a video, the value score may objectively reflect value of the video. In addition, by setting a weight of each of user interaction data, contribution of each user interaction data to the value score may be adjusted, so that the accuracy of the value score is improved. In other examples, various fusion algorithms may be used to integrate user interaction data to obtain a value score of each video.

In operation S312, videos having value scores higher than a first threshold are selected out from a plurality of videos as a first group of videos.

The selection process shown in FIG. 3 may be called a first selection stage. Low value videos may be greatly removed in the first selection stage. The first group of videos obtained by selecting may include one or more videos.

In some embodiments, the first group of videos obtained by selecting in operation S312 may be directly used as the target video. A process of generating subtitle text segments may be performed on the first group of videos. In other embodiments, the first group of videos obtained by selecting in operation S312 may be further selected in a second stage to obtain a more precise and accurate result.

Figure 4:
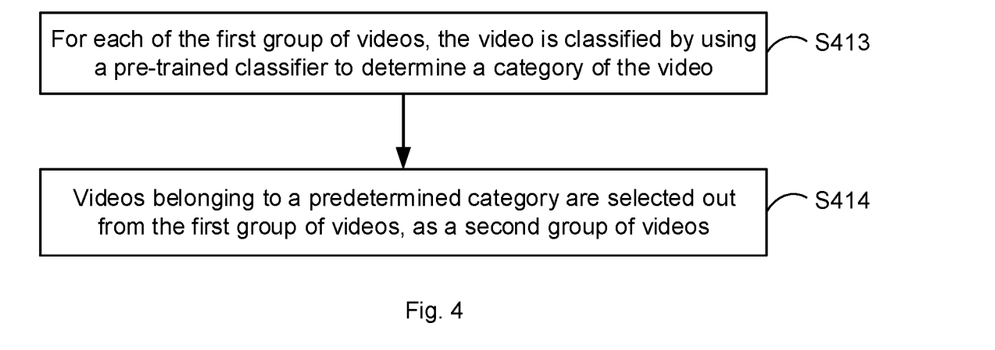
FIG. 4 is a flowchart of a video selection process according to another embodiment of the present disclosure.

FIG. 4 is a flowchart of a video selection process according to another embodiment of the present disclosure, and is used to exemplarily illustrate above implementation of a target video selection out from a plurality of videos.

As shown in FIG. 4, the video selection process is performed after the first selection stage of the embodiment as described above, and may further include operations S413 to S414.

In operation S413, for each of the first group of videos, the video is classified by using a pre-trained classifier to determine a category of the video.

Herein, an exemplary selection process for the first group of videos has been described above and will not be repeated here. As an example, a classifier for a plurality of known categories may be constructed in advance based on a machine learning algorithm. A large number of video samples may be obtained and each of the video samples may be labeled with a category label. The video samples with category labels may be used to train the classifier to obtain a classifier having excellent ability of classifying videos. A classification criteria and classification granularity for the plurality of known categories may be set according to demands. For example, the plurality of known categories may include categories of knowledge, popular science, film and television, music, food and game, etc., and is not limited here. According to a statistical result for big data, for example, for users, videos of categories of knowledge and popular science have higher values for repeat watching, and these categories may be set as predetermined categories.

In operation S414, videos belonging to a predetermined category are selected out from the first group of videos, as a second group of videos.

Based on a result of the first selection stage, the second selection stage starts from classifying based on video contents, and a second group of videos having greater value for locating a playing node is further selected. The second group of videos includes one or more videos. Herein, a classifier is trained based on a large number of known video samples, and a classification result is more accurate. Users have different watching habits for different categories of videos, and the second group of videos obtained by selecting based on categories is more reasonable and accurate.

In some embodiments, the second group of videos obtained by selecting in operation S414 may be directly used as the target video. In other embodiments, the second group of videos obtained by selecting in operation S414 may be further selected in a third stage to obtain a more precise and accurate selection result.

In a third selection stage, on basis of the second group of videos obtained, subtitle text segments and related information of the subtitle text segments of each video may be generated, and then a final target video is selected out from the second group of videos based on the related information of the subtitle text segments.

As an example, for each video of the second group of videos, audio data of the video is extracted. Then automatic speech recognition (ASR) is performed on the audio data extracted to obtain a recognition result. Herein, the recognition result may include: a plurality of subtitle text segments of the video, and start time information and end time information of each of the plurality of subtitle text segments of the video. For example, audio data having duration of t is extracted from a video, and in a process of automatic speech recognition on this audio data, by setting a segment division standard, where pause duration in the audio is longer than predetermined duration (for example, pause for more than 3 seconds), a plurality of text segments may be recognized as the plurality of subtitle text segments. In addition, start time information and end time information of each text segment in above duration t are further recorded.

In an embodiment of the present disclosure, for each video of the second group of videos, a proportion y of total duration of the plurality of subtitle text segments of the video to total duration of the video may be determined based on the start time information and the end time information of each of the plurality of subtitle text segments of the video. Then, a video having a proportion y higher than a second threshold may be selected out from the second group of videos, as the target video obtained after being selected in the third stage. The server stores above recognition results for the target video to preserve the subtitle text segments and the related time information of the target video.

It should be understood that in general, the higher the proportion of duration of subtitle text segments of a video is, the richer information content the video has, thus having higher value for locating a video playing node, which will be watched repeatedly by a user. Therefore, the third selection stage of the embodiment starts from selecting based on a proportion of duration of subtitle text segments in the video, videos having higher proportion of duration are selected out from the second group of videos, so that the target video having rich information content may be further selected out.

In another embodiment of the present disclosure, for each video of the second group of videos, a semantic analysis may be performed on the plurality of subtitle text segments of the video to obtain a logic score of the plurality of subtitle text segments of the video. The logic score is used to indicate a semantic logic degree contained in the plurality of subtitle text segments. The higher the semantic logic degree is, the more complete and meaningful the semantic is. Next, a video having a logic score higher than a third threshold is selected out from the second group of videos, as the target video obtained by selecting in the third stage.

It should be understood that in general, the more complete and clear the semantic contained in the subtitle text segment of the video is, the more valuable the information contained in the video is, thus having higher value for locating a video playing node, which will be watched repeatedly by a user. Therefore, the third selection stage of the embodiment starts from selecting based on a semantic logic contained in the subtitle text segments of the video, and a video having complete and meaningful semantic is selected out from the second group of videos as the final target video.

Figure 5:
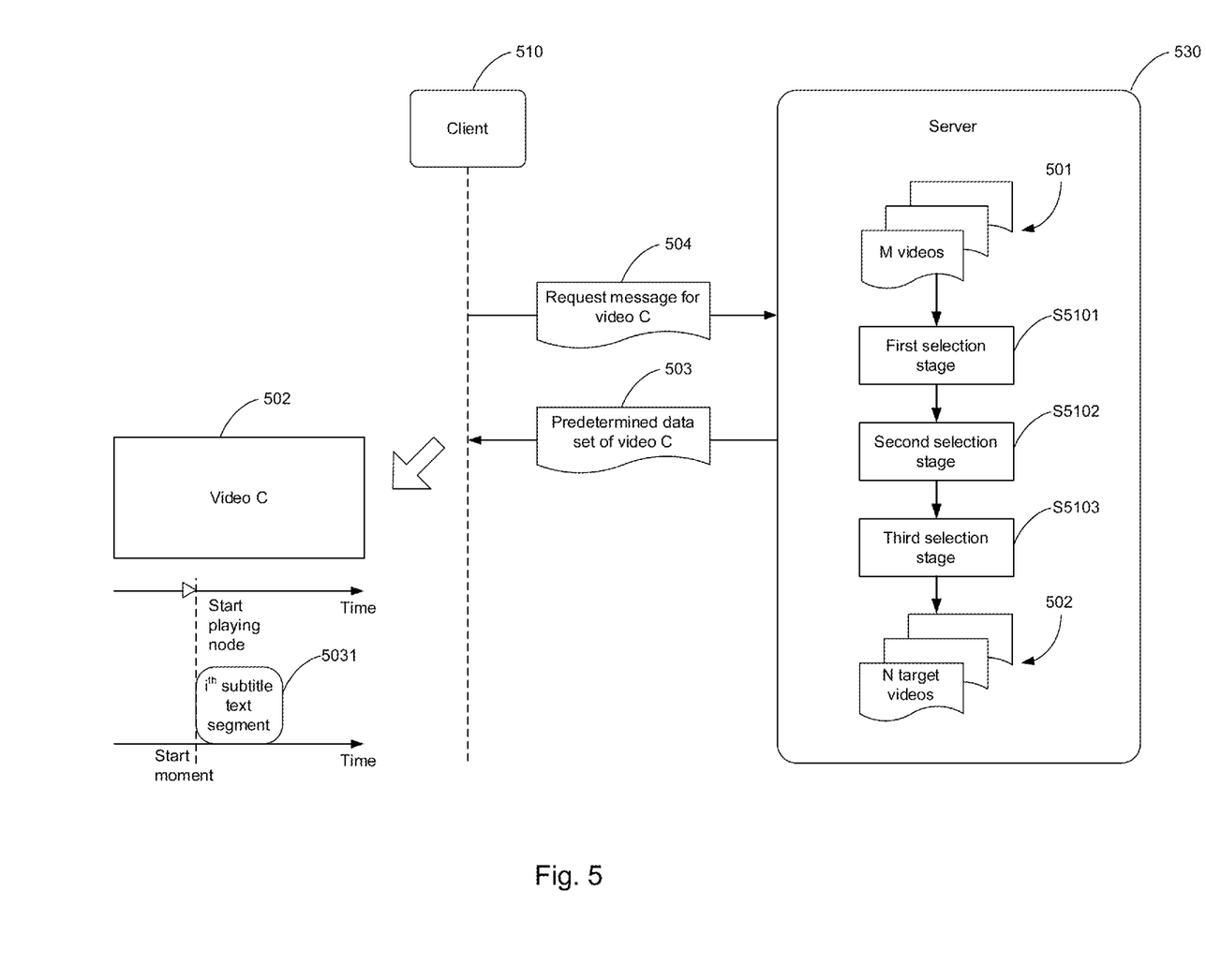
FIG. 5 is a schematic diagram of a process of locating a video playing node according to an embodiment of the present disclosure.

FIG. 5 is a schematic diagram of a process of locating a video playing node according to an embodiment of the present disclosure, and is used to exemplarily illustrate an interaction process between a client 510 and a server 530.

As shown in FIG. 5, a selection S5101 in the first stage, a selection S5102 in the second stage and a selection S5103 in the third stage are successively performed on M videos 501 by the server 530 to obtain N target videos 502. Both M and N are positive integers, and M is greater than N. Herein, the selection in the first stage, the selection in the second stage and the selection in the third stage have been exemplarily illustrated above respectively, and will not be repeated here. The server 530 stores a predetermined data set 503 of each target video, and the predetermined data set 503 of each target video may include: video data of the target video, a plurality of subtitle text segments of the target video, and start time information (for example, start timestamp information) and end time information (for example, end timestamp information) of the plurality of subtitle text segments.

The client 510 receives a selection operation from the user for a certain video (for example, video C), and may send a request message 504 for video C to the server 530. The server 530 may determine whether video C belongs to above N target videos 502. In other examples, this determination process may also be performed on the client. In a case where video C does not belong to the target videos, video data of video C is directly sent to the client 510. In a case where video C belongs to the target videos, the server 530 sends the predetermined data set 503 of video C to the client 510. The client 510 displays n subtitle text segments 5031 of video C to the user, herein, n is an integer greater than 1.

In response to a user's trigger operation on an $i^{th}$ subtitle text segment among the n subtitle text segments, the client 510 determines a start playing node of video C based on start time information of the $i^{th}$ subtitle text segment. Herein, i is an integer greater than or equal to 1 and less than or equal to n. As an example, according to the start time information of the $i^{th}$ subtitle text segment, a start moment (for example, 8:20) of the subtitle text segment in video C is determined. The start moment is used as the start playing node of video C. When video C is loaded and played according to the video data of video C, video C is played directly from the start playing node.

According to the embodiment of the present disclosure, an end moment (for example, 15:32) of the $i^{th}$ subtitle text segment in video C may be further determined according to end time information of the $i^{th}$ subtitle text segment. The end moment is used as an end playing node of video C. In a process of loading and playing video C according to the video data of video C, when video C is played to the end playing node, playing of video C is stopped. In above example, video C may be played from 8:20 to 15:32 according to the user's trigger operation on the subtitle text segment, and this part of video content is the content that the user is currently interested in and needs to watch. Above process greatly simplifies an operation of a user, facilitates finding or recalling current interested contents by the user, and may accurately locate to a playing node the user being interested in, meeting the demand of the user.

Figure 6:
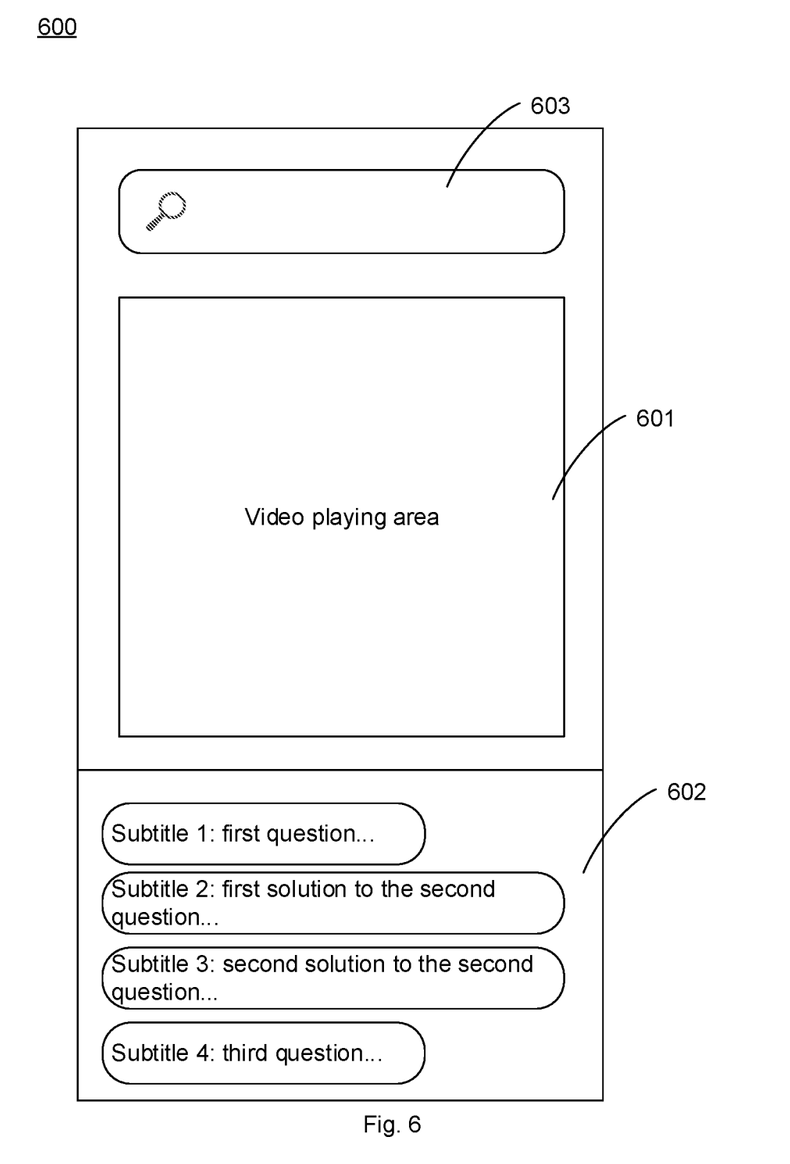
FIG. 6 is a schematic diagram of a video playing interface according to an embodiment of the present disclosure.

FIG. 6 is a schematic diagram of a video playing interface according to an embodiment of the present disclosure, and is used to exemplarily illustrate a process of playing a video on the client.

As shown in FIG. 6, a video playing interface 600 may include a video playing area 601, a subtitle displaying area 602, and a searching area 603. For example, a target video includes a plurality of subtitle text segments as follows: "first question . . . ", "first solution to the second question . . . ", "second solution to the second question" and "third question . . . ", etc. A client may display the plurality of subtitle text segments in the subtitle displaying area 602. In a case of incomplete displaying, a user may view the plurality of subtitle text segments by sliding, dragging and other operations. When the user wishes to watch certain content in the video, a trigger operation, such as clicking, on a corresponding subtitle text segment may be performed. In responds to the user's trigger operation on some subtitle text segment (for example, "first solution to the second question . . . "), the client set a start time of the subtitle text segment in the video as a start playing node of the video, and the video directly jumps to the start playing node and starts to play.

Further, as shown in FIG. 6, the video playing solution according to the embodiment of the present disclosure may further support a search function for the subtitle text segments. As an example, the searching area 603 includes a search control such as a search box and a search button. In a case where too many subtitle text segments of the video exist, the user may input a search term in the searching area 603 and carry out a trigger operation (for example, clicking a trigger button, etc.). In response to the user's trigger operation, the search term is obtained. A matching subtitle text segment for the search term is determined from the plurality of subtitle text segments of the current video. For example, in above example, a search term is "third", then a matching subtitle text segment obtained by the matching process is "third question . . . ". A predetermined identifier is displayed at a display location of the matching subtitle text segment, to mark the matching subtitle text segment conspicuously, so as to prompt the user to pay attention to the matching subtitle text segment. The user may directly trigger the matching subtitle text segment to realize locating and jump of the playing node of the video.

Figure 7:
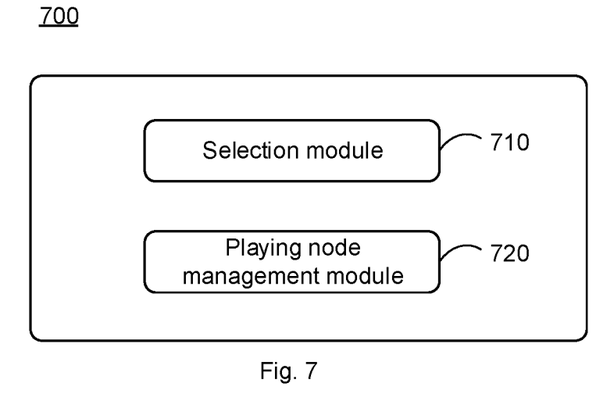
FIG. 7 is a block diagram of an apparatus for locating a video playing node according to an embodiment of the present disclosure.

FIG. 7 is a block diagram of an apparatus for locating a video playing node according to an embodiment of the present disclosure.

As shown in FIG. 7, an apparatus 700 for locating a video playing node may be applied to a server, and the apparatus 700 for locating a video playing node may include a selection module 710 and a playing node management module 720.

The selection module 710 is configured to select a target video out from a plurality of videos.

The playing node management module 720 is configured to send the target video, a plurality of subtitle text segments of the target video and start time information of each of the plurality of subtitle text segments to a client, to cause the client to display the plurality of subtitle text segments, and determine, in response to a trigger operation on an any subtitle text segment of the plurality of subtitle text segments, a start playing node of the target video based on the start time information of the any subtitle text segment.

According to an embodiment of the present disclosure, the selection module 710 may include a score sub-module and a first selection sub-module. The score sub-module is configured to for each of the plurality of videos, calculate a value score of the video based on user interaction data of the video. The first selection sub-module is configured to select videos having value scores higher than a first threshold out from the plurality of videos, as a first group of videos, and obtain the target video based on the first group of videos.

According to an embodiment of the present disclosure, the selection module 710 may further include a classification sub-module and a second selection sub-module. The classification sub-module is configured to for each of the first group of videos, classify the video using a pre-trained classifier to determine a category of the video. The second selection sub-module is configured to select videos belonging to a predetermined category out from the first group of videos, as a second group of videos, and obtain the target video based on the second group of videos.

As an example, the selection module 710 may further include a first analysis sub-module and a third selection sub-module. The first analysis sub-module is configured to for each of the second group of videos, extract audio data of the video, perform an automatic speech recognition on the audio data to obtain a recognition result, and determine a first proportion of total duration of the plurality of subtitle text segments of the video to total duration of the video based on the start time information and the end time information of each of the plurality of subtitle text segments of the video. The recognition result includes a plurality of subtitle text segments of the video, and start time information and end time information of each of the plurality of subtitle text segments of the video. The third selection sub-module is configured to select a video having a first proportion higher than a second threshold out from the second group of videos, as the target video.

As an example, the selection module 710 may further include a second analysis sub-module and a fourth selection sub-module. The second analysis sub-module is configured to for each of the second group of videos, extract audio data of the video in response to the video belonging to the predetermined category, perform an automatic speech recognition on the audio data to obtain a recognition result, and perform a semantic analysis on the plurality of subtitle text segments of the video to obtain a logic score of the plurality of subtitle text segments of the video. The recognition result includes a plurality of subtitle text segments of the video, and start time information and end time information of each of the plurality of subtitle text segments of the video. The fourth selection sub-module is configured to select a video having a logic score higher than a third threshold out from the second group of videos, as the target video.

According to an embodiment of the present disclosure, the playing node management module 720 is further configured to send the end time information of each of the plurality of subtitle text segments of the target video to the client, to cause the client to determine, in response to a trigger operation on an any subtitle text segment of the plurality of subtitle text segments, an end playing node of the target video based on the end time information of the any subtitle text segment.

As an example, the user interaction data includes at least one of: a second proportion of a quantity of users whose number of times watching the video is more than a fourth threshold to a total quantity of users who watch the video; a quantity of comments for the video; a quantity of collections for the video; and a quantity of praises for the video.

For example, the score sub-module is configured to calculate a weighted sum of the second proportion, the quantity of comments, the quantity of collections and the quantity of praises using preset first weight, second weight, third weight and fourth weight, to obtain the value score.

Figure 8:
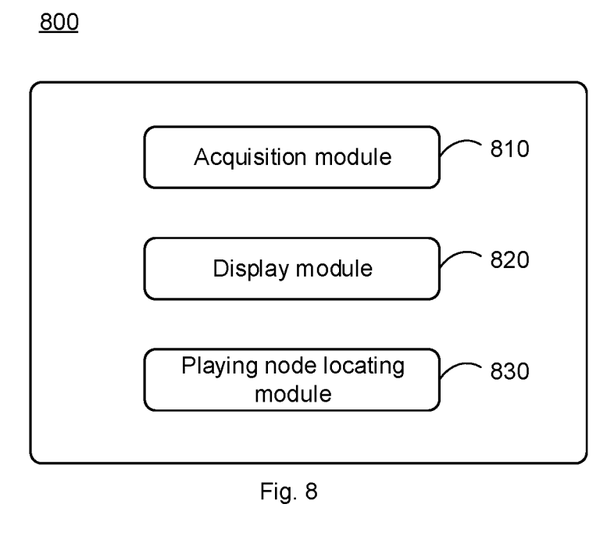
FIG. 8 is a block diagram of an apparatus for locating a video playing node according to another embodiment of the present disclosure.

FIG. 8 is a block diagram of an apparatus for locating a video playing node according to another embodiment of the present disclosure.

As shown in FIG. 8, an apparatus for locating a video playing node 800 may be applied to a client, and the apparatus for locating a video playing node 800 may include an acquisition module 810, a display module 820 and a playing node locating module 830.

The acquisition module 810 is configured to acquire a target video, a plurality of subtitle text segments of the target video, and start time information of each of the plurality of subtitle text segments, wherein the target video is obtained by selecting out from a plurality of videos.

The display module 820 is configured to display the plurality of subtitle text segments.

The playing node locating module 830 is configured to determine, in response to a trigger operation on an any of the plurality of subtitle text segments, a start playing node of the target video based on the start time information of the any subtitle text segment.

According to an embodiment of the present disclosure, the playing node locating module 830 includes a first determination sub-module configured to determine a start moment of the any subtitle text segment in the target video according to the start time information of the any subtitle text segment; and a first locating sub-module configured to set the start moment as the start playing node of the target video to start to play the target video from the start playing node.

According to an embodiment of the present disclosure, the apparatus 800 further includes a search processing module configured to display a search control, acquire a search term in response to a trigger operation on the search control, determine a matching subtitle text segment for the search term from the plurality of subtitle text segments, and display a predetermined identifier at a display location for the matching subtitle text segment.

According to an embodiment of the present disclosure, the acquisition module 810 is further configured to acquire end time information of each of the plurality of subtitle text segments. The playing node locating module 830 further includes a second determination sub-module and a second locating sub-module. The second determination sub-module is configured to determine an end moment of the any subtitle text segment in the target video according to the end time information of the any subtitle text segment. The second locating sub-module is configured to set the end moment as the end playing node of the target video to stop playing the target video when the target video is played to the end playing node.

It should be noted that the implementation modes, solved technical problems, realized functions and achieved technical effects of each module/unit/sub-unit in the embodiments of the apparatus part are respectively the same as or similar to the implementation modes, solved technical problems, realized functions and achieved technical effects of each corresponding step in the embodiments of the method part, and will not be repeated here.

Any number of the modules, sub modules, units and sub units according to the embodiments of the present disclosure, or at least part of the functions of any number of them may be implemented in one module. Any one or more of the modules, sub modules, units and sub units according to the embodiments of the present disclosure may be split into multiple modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module that, when executed, perform the corresponding functions.

According to an embodiment of the present disclosure, the present disclosure further provides an electronic device and a readable storage medium.

Figure 9:
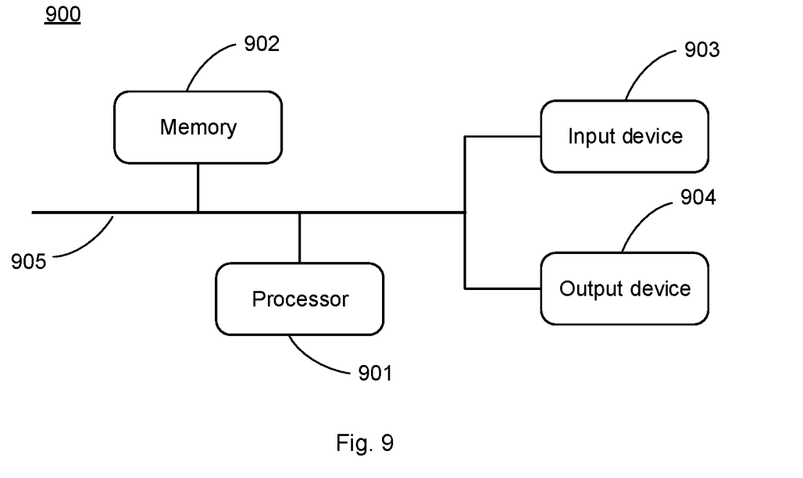
FIG. 9 is a block diagram of an electronic device used to perform a method for locating a video playing node according to an embodiment of the present disclosure.

FIG. 9 is a block diagram of an electronic device used to perform a method for locating a video playing node according to an embodiment of the present disclosure. The electronic device may be a server performing above method for locating a video playing node, and may further be an electronic device where a client performing the method for locating a video playing node is located. The electronic device is intended to represent various forms of digital computers, such as a laptop computer, a desktop computer, a workstation, a personal digital assistant, a server, a blade server, a mainframe computer, and other suitable computers. The electronic device may also represent various forms of mobile devices, such as a personal digital processor, a cellular phone, a smart phone, a wearable device, and other similar computing devices. The components as illustrated herein and connections, relationships, and functions thereof are merely examples, and are not intended to limit the implementation of the present disclosure as described and/or required herein.

As shown in FIG. 9, the electronic device 900 includes one or more processors 901, a memory 902, and interface(s) for connecting various components, including high-speed interface(s) and low-speed interface(s). The various components are connected to each other by using different buses, and can be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, multiple processors and/or multiple buses may be used with multiple memories if necessary. Similarly, multiple electronic devices can be connected in such a manner that each electronic device providing a part of necessary operations (for example, as a server array, a group of blade servers, or a multi-processor system). One processor 901 is taken as an example in FIG. 9.

The memory 902 is the non-transitory computer-readable storage medium provided by this disclosure. Wherein, the memory stores instructions executable by at least one processor, to cause the at least one processor to perform the method for locating a video playing node provided by the present disclosure. The non-transitory computer-readable storage medium of the present disclosure stores computer instructions for causing a computer to perform the method for locating a video playing node provided by the present disclosure.

As a non-transitory computer-readable storage medium, the memory 902 can be used to store non-transitory software programs, non-transitory computer-executable programs, and modules, such as program instructions/modules corresponding to the method for locating a video playing node in the embodiment of the present disclosure. The processor 901 performs various functional applications and data processing of the server by executing the non-transitory software programs, instructions, and modules stored in the memory 902, thereby realizing the method for locating a video playing node in above embodiments.

The memory 902 may include a program storage area and a data storage area. The program storage area may store an operating system and an application program required by at least one function; the storage data area may store data etc. generated by using the electronic device. In addition, the memory 902 may include a high-speed random access memory, and may also include a non-transitory memory, such as at least one magnetic disk storage device, a flash memory device, or other non-transitory solid-state storage devices. In some embodiments, the memory 902 may optionally include a memory located remotely to the processor 901, and such remote memory may be connected to the electronic device through a network. Examples of the network described above include, but are not limited to, Internet, intranet, local area network, mobile communication network, and combination thereof.

The electronic device for the method for locating a video playing node may further include: an input device 903 and an output device 904. The processor 901, the memory 902, the input device 903, and the output device 904 may be connected by a bus 905 or in other manners. In FIG. 9, the connection by a bus 905 is taken as an example.

The input device 903 can receive input information of numbers or characters, and generate key input signals related to user settings and function control of the electronic device for the method for locating a video playing node, such as touch screen, keypad, mouse, trackpad, touchpad, indicator stick, one or more mouse buttons, trackball, joystick and other input devices. The output device 904 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein can be implemented in digital electronic circuit systems, integrated circuit systems, application-specific ASICs (application-specific integrated circuits), computer hardware, firmware, software, and/or combinations thereof. These embodiments may be implemented in one or more computer programs executed and/or interpreted on a programmable system including at least one programmable processor. The programmable processor can be a dedicated or general-purpose programmable processor, which can receive data and instructions from a storage system, at least one input device, and at least one output device, and send the data and instructions to the storage system, the at least one input device, and the at least one output device.

These computer programs (also referred as programs, software, software applications, or codes) include machine instructions for programmable processors, and can utilize high-level programming languages, object-oriented programming languages, and/or assembly/machine language to implement these calculation procedures. As used herein, the terms "machine-readable medium" and "computer-readable medium" refer to any computer program product, device, and/or apparatus (e.g., magnetic disks, optical disks, memory, programmable logic devices (PLD)) for providing machine instructions and/or data to a programmable processor, including machine-readable media for receiving machine instructions as machine-readable signals. The term "machine-readable signal" refers to any signal for providing machine instructions and/or data to a programmable processor.

In order to implement interaction with the user, the systems and technologies described herein can be implemented on a computer including a display device (for example, CRT (Cathode Ray Tube) or LCD (Liquid Crystal Display)) display) for displaying information to the user; and a keyboard and a pointing device (for example, a mouse or trackball) through which the user can provide input to the computer. Other types of devices can also be used to implement interaction with the user. For example, the feedback provided to the user can be any form of sensory feedback (e.g., visual feedback, auditory feedback, or tactile feedback), and input received from the user can be any form (including acoustic input, voice input, or tactile input).

The systems and technologies described here can be implemented in a computing system including back-end components (for example, as a data server), or a computing system including middleware components (for example, an application server), or a computing system including front-end components (for example, a user computer having a graphical user interface or a web browser through which the user can interact with the embodiments of the systems and technologies described herein), or a computing system including any combination of such background components, intermediate components, or front-end components. The components of the system can be connected to each other by digital data communication (for example, communication network) in any form or through any medium. Examples of communication networks include: LAN (Local Area Network), WAN (Wide Area Network), and Internet.

A computer system can include a client and a server. The client and server are generally far away from each other and usually interact through a communication network. The relationship between the client and the server is generated through computer programs running on the corresponding computers and having a client-server relationship with each other.

According to the technical solution of the present disclosure, a target video having a value for locating the playing node may be selected out from the large number of videos, and a plurality of subtitle text segments of the target video may be displayed to a user, in a case where the target video is played. Furthermore, a start playing node of the target video may be determined based on start time information of a subtitle text segment selected by the user. In above process, the processing only aiming at locating a playing node of the target video may save a large number of computing resources and improve interaction efficiency between a server and a client. A plurality of subtitle text segments are displayed jointly, so that the user can determine an expected content node in a short time, and the start playing node of a current video may be accurately determined based on the start time information of the subtitle text segment specified by the user. The method, apparatus, device and storage medium for locating a video playing node according to the embodiments of the present disclosure are related to multiple technologies such as cloud computing, big data, video processing and other technologies.

It should be understood that steps of the processes illustrated above can reordered, added or deleted in various manners. For example, the steps described in the present disclosure can be performed in parallel, sequentially, or in different orders, as long as a desired result of the technical solution of the present disclosure can be achieved, this is not limited herein.

The above embodiments do not constitute a limitation on the scope of protection of the present disclosure. Those skilled in the art should understand that various modifications, combinations, sub-combinations, and substitutions can be made according to design requirements and other factors. Any modifications, equivalent replacements and improvements made within the spirit and principles of the present disclosure shall be included in the scope of the present disclosure.

I claim:

1. A method for locating a video playing node, comprising:
   selecting a target video out from a plurality of videos; and
   sending the target video, a plurality of subtitle text segments of the target video and start time information of each of the plurality of subtitle text segments to a client, to cause the client to display the plurality of subtitle text segments, and determine, in response to a trigger operation on an any subtitle text segment of the plurality of subtitle text segments, a start playing node of the target video based on the start time information of the any subtitle text segment,
   wherein selecting a target video out from a plurality of videos comprises:
   for each of the plurality of videos, calculating a value score of the video based on user interaction data of the video;
   selecting videos having value scores higher than a first threshold out from the plurality of videos, as a first group of videos; and
   obtaining the target video based on the first group of videos,
   wherein obtaining the target video based on the first group of videos comprises:
   for each of the first group of videos, classifying the video using a pre-trained classifier to determine a category of the video;
   selecting videos belonging to a predetermined category out from the first group of videos, as a second group of videos; and
   obtaining the target video based on the second group of videos,
   wherein obtaining the target video based on the second group of videos comprises:
   for each of the second group of videos,
   extracting audio data of the video;
   performing an automatic speech recognition on the audio data to obtain a recognition result, wherein the recognition result comprises: a plurality of subtitle text segments of the video, and start time information and end time information of each of the plurality of subtitle text segments of the video;
   determining a first proportion of total duration of the plurality of subtitle text segments of the video to total duration of the video based on the start time information and the end time information of each of the plurality of subtitle text segments of the video; and
   selecting a video having a first proportion higher than a second threshold out from the second group of videos, as the target video.

2. The method of claim 1, further comprising:
   sending the end time information of each of the plurality of subtitle text segments of the target video to the client, to cause the client to determine, in response to a trigger operation on an any subtitle text segment of the plurality of subtitle text segments, an end playing node of the target video based on the end time information of the any subtitle text segment.

3. The method of claim 1, wherein the user interaction data comprises at least one of:
   a second proportion of a quantity of users whose times watching the video are more than a fourth threshold to a total quantity of users who watch the video;
   a quantity of comments for the video;
   a quantity of collections for the video; and
   a quantity of praises for the video.

4. The method of claim 3, wherein calculating a value score of the video based on user interaction data of the video comprises:
   calculating a weighted sum of the second proportion, the quantity of comments, the quantity of collections and the quantity of praises using preset first weight, second weight, third weight and fourth weight, to obtain the value score.

5. A method for locating a video playing node, comprising:
   acquiring a target video, a plurality of subtitle text segments of the target video, and start time information of each of the plurality of subtitle text segments, wherein the target video is obtained by selecting out from a plurality of videos according to the method of claim 1,
   displaying the plurality of subtitle text segments;
   determining, in response to a trigger operation on an any of the plurality of subtitle text segments, a start playing node of the target video based on the start time information of the any subtitle text segment.

6. The method of claim 5, wherein determining a start playing node of the target video based on the start time information of the any subtitle text segment comprises:
determining a start moment of the any subtitle text segment in the target video according to the start time information of the any subtitle text segment; and
setting the start moment as the start playing node of the target video to start to play the target video from the start playing node.

7. The method of claim 6, further comprising:
acquiring end time information of each of the plurality of subtitle text segments;
determining an end moment of the any subtitle text segment in the target video according to the end time information of the any subtitle text segment; and
setting the end moment as the end playing node of the target video to stop playing the target video when the target video is played to the end playing node.

8. The method of claim 5, further comprising:
displaying a search control;
acquiring a search term in response to a trigger operation on the search control;
determining a matching subtitle text segment for the search term from the plurality of subtitle text segments; and
displaying a predetermined identifier at a display location for the matching subtitle text segment.

9. An electronic device, comprising:
at least one processor; and
a memory coupled in communication with the at least one processor; wherein,
the memory stores instructions executable by the at least one processor, and the instructions, when executed by the at least one processor, cause the at least one processor to perform the method of claim 5.

10. A non-transitory computer-readable storage medium having computer instructions stored thereon that, when executed by a computer, cause the computer to perform the method of claim 5.

11. An electronic device, comprising:
at least one processor; and
a memory coupled in communication with the at least one processor; wherein,
the memory stores instructions executable by the at least one processor, and the instructions, when executed by the at least one processor, cause the at least one processor to perform the method of claim 1.

12. A non-transitory computer-readable storage medium having computer instructions stored thereon that, when executed by a computer, cause the computer to perform the method of claim 1.

13. A method for locating a video playing node, comprising:
selecting a target video out from a plurality of videos; and
sending the target video, a plurality of subtitle text segments of the target video and start time information of each of the plurality of subtitle text segments to a client, to cause the client to display the plurality of subtitle text segments, and determine, in response to a trigger operation on an any subtitle text segment of the plurality of subtitle text segments, a start playing node of the target video based on the start time information of the any subtitle text segment,
wherein selecting a target video out from a plurality of videos comprises:
for each of the plurality of videos, calculating a value score of the video based on user interaction data of the video;
selecting videos having value scores higher than a first threshold out from the plurality of videos, as a first group of videos; and
obtaining the target video based on the first group of videos,
wherein obtaining the target video based on the first group of videos comprises:
for each of the first group of videos, classifying the video using a pre-trained classifier to determine a category of the video;
selecting videos belonging to a predetermined category out from the first group of videos, as a second group of videos; and
obtaining the target video based on the second group of videos,
wherein that obtaining the target video based on the second group of videos comprises:
for each of the second group of videos,
extracting audio data of the video in response to the video belonging to the predetermined category;
performing an automatic speech recognition on the audio data to obtain a recognition result, wherein the recognition result comprises: a plurality of subtitle text segments of the video, and start time information and end time information of each of the plurality of subtitle text segments of the video;
performing a semantic analysis on the plurality of subtitle text segments of the video to obtain a logic score of the plurality of subtitle text segments of the video; and
selecting a video having a logic score higher than a third threshold out from the second group of videos, as the target video.

14. The method of claim 13, further comprising:
sending the end time information of each of the plurality of subtitle text segments of the target video to the client, to cause the client to determine, in response to a trigger operation on an any subtitle text segment of the plurality of subtitle text segments, an end playing node of the target video based on the end time information of the any subtitle text segment.

15. The method of claim 13, wherein the user interaction data comprises at least one of:
a second proportion of a quantity of users whose times watching the video are more than a fourth threshold to a total quantity of users who watch the video;
a quantity of comments for the video;
a quantity of collections for the video; and
a quantity of praises for the video.

16. A method for locating a video playing node, comprising:
acquiring a target video, a plurality of subtitle text segments of the target video, and start time information of each of the plurality of subtitle text segments, wherein the target video is obtained by selecting out from a plurality of videos according to the method of claim 13;
displaying the plurality of subtitle text segments;
determining, in response to a trigger operation on an any of the plurality of subtitle text segments, a start playing node of the target video based on the start time information of the any subtitle text segment.

17. An electronic device, comprising:
at least one processor; and
a memory coupled in communication with the at least one processor; wherein,
the memory stores instructions executable by the at least one processor, and the instructions, when executed by the at least one processor, cause the at least one processor to perform the method of claim 16.

18. A non-transitory computer-readable storage medium having computer instructions stored thereon that, when executed by a computer, cause the computer to perform the method of claim 16.

19. An electronic device, comprising:
at least one processor; and
a memory coupled in communication with the at least one processor; wherein,
the memory stores instructions executable by the at least one processor, and the instructions, when executed by the at least one processor, cause the at least one processor to perform the method of claim 13.

20. A non-transitory computer-readable storage medium having computer instructions stored thereon that, when executed by a computer, cause the computer to perform the method of claim 13.

* * * * *